Sept. 27, 1960

W. E. DANIELSON ET AL 2,954,266

PRECISION MEASURING DEVICE

Filed Oct. 18, 1957

INVENTORS: W. E. DANIELSON
R. W. SEARS

BY Alan C. Rose

ATTORNEY

FIG. 5

Sept. 27, 1960　　W. E. DANIELSON ET AL　　2,954,266
PRECISION MEASURING DEVICE Filed Oct. 18, 1957　　　　　　　　　　　　　　8 Sheets-Sheet 5

*FIG. 7*

INVENTORS: **W. E. DANIELSON
R. W. SEARS**
BY Alan C. Rose
ATTORNEY

Sept. 27, 1960 W. E. DANIELSON ET AL 2,954,266
PRECISION MEASURING DEVICE
Filed Oct. 18, 1957 8 Sheets-Sheet 7

FIG. 9

INVENTORS: W. E. DANIELSON
R. W. SEARS
BY
Alan C. Rose
ATTORNEY

FIG. 10

INVENTORS: W. E. DANIELSON
R. W. SEARS

United States Patent Office 2,954,266
Patented Sept. 27, 1960

2,954,266

PRECISION MEASURING DEVICE

Warren E. Danielson, Berkeley Heights, and Raymond W. Sears, West Orange, N.J., assignors to Bell Telephone Laboratories, Incorporated, New York, N.Y., a corporation of New York Filed Oct. 18, 1957, Ser. No. 690,974

22 Claims. (Cl. 346—33)

This invention relates to precision measuring devices and more particularly to such devices for measuring periodic structures.

In vacuum tube structures which contain a series of periodically repeated sections it often becomes extremely important that the periodicity of the structure be precisely controlled. Such is the case in tubes of the traveling wave type containing a helix as an energy transmission element. In such a tube it is usually intended that the helix be perfectly periodic throughout its length. Undesirable effects have resulted from slight deviations from periodicity in such structures, particularly where such deviations are of a periodic nature themselves.

When the size of the wire being used and the diameter and pitch of a helix in a traveling wave tube are considered, it is apparent that it is no small task to manufacture perfect helices. Furthermore, in considering the method of manufacture of such structures in which a lead screw controls the travel of the helix winding machine, it is to be expected that imperfections in the pitch of the lead screw would result in periodically recurring imperfections in the manufactured helix. Such is quite often the case and presents an increasingly serious problem as the assurance of improved pitch uniformity becomes essential for tube applications to be extended to higher frequencies.

In the past there has been no practical method available for measuring the manufactured helix to detect deviations from its intended periodicity. Accordingly, a procedure resorted to has been that of assembling the helix in the traveling wave tube and then testing the finished tube in a circuit to see if it functions properly. Thus the inclusion of an imperfect helix in an otherwise satisfactory tube structure results in the rejection of the entire unit. Such a procedure is wasteful and uneconomical when compared with the possibility of accurately and simply testing the helix structures prior to their inclusion in the complete traveling wave tube. To make it feasible to individually test each helix structure requires a device which is simple and rapid in its operation and which is capable of measuring very small intervals with extreme precision over ranges of several inches. Furthermore, it is desirable that the results of such measurement be presented as a permanent record and, in view of the particular trouble presented by periodic deviations from periodicity, that the device make such imperfections readily apparent.

Heretofore the only method known for making the required test measurements, one which is obviously unsuited as a step in the manufacturing operation, has been the use of an optical comparator to measure the individual locations of the helix turns of the structure under test. This procedure requires the reading and recording of the position data by an operator and its processing in some computing device to determine the possible presence of periodic deviations from perfection. The average time required for completing this procedure has amounted to approximately two man-days for one structure. Furthermore, the human element involved practically insures the presence of errors in the testing procedure.

Measuring apparatus, in accordance with our invention as herein described, reduces the required time for the measurement and evaluation process from two man-days to five minutes. In doing so it eliminates the possibility of human error, provides the desired measurement with the necessary precision and presents its evaluation information as a readily interpreted permanent record.

It is accordingly a general object of this invention to provide an improved precision measuring device.

Another object of this invention is the provision of a device for measuring periodic structures.

A further object of this invention is the provision of a precision device for detecting deviations from periodicity of a measured periodic structure.

Another object of this invention is the production of a permanent record of measured deviations from periodicity of a traveling wave tube helix structure.

These and other objects of this invention are achieved in one specific embodiment thereof which combines optical, electronic, mechanical and computer techniques to determine the degree of perfection of a helical structure and present the result of its measurement in the form of a pen recording. As the essential precision standard to compare measured distances against, we advantageously employ a pair of optical gratings through which is directed a collimated light beam. One grating is fixed while the other grating is moved with the structure being measured and parallel to the fixed grating. The light beam through the two gratings is thus periodically interrupted with an effect similar to that which is observed when one looks through a pair of combs that are slowly moved relative to each other. This periodic interruption is detected by a photomultiplier tube which converts the light signal into electrical pulses. A similar arrangement is described by D. T. N. Williamson in "Automation," December 1955, page 65. By selecting for the movable grating an optical grating having lines two microns apart, periodic signals are generated by the photomultiplier tube for each two microns of movement of the grating. Differentiation of this signal produces two pulses for each signal period thereby providing a pulse for each micron of movement of the grating.

Electrical pulses so produced are fed into an electronic counter which, in this specific embodiment of our invention, employs multicathode gaseous discharge stepping tubes with associated storage circuitry. The counter is arranged to have a variable count cycle which, in the operation of the device, is preset at the intended pitch of the structure being measured. A second light beam is caused to shine through the helix being measured and thence to a second photomultiplier tube. Thus a shadow falls on the photomultiplier tube each time a helix turn crosses this light beam. The output from this photomultiplier tube is directed to the storage section of the counter to cause this section to assume a circuit condition corresponding to the state of the electronic counter existing when the helix turn shadow is detected. This information is then transformed through a digital-to-analog converter and presented to a pen recorder which makes a permanent record indicating the precise position of each helix turn relative to its intended location. By presenting the information in this form, the record makes periodic deviations from ideal periodicity readily evident, since they show up as a plot not unlike that of a sine wave.

Because the intended pitch of the helix being measured is not always an integral number of microns in length there would normally be a tendency for the pen record to move toward one edge or the other of the paper as the fractions of a micron left over from each count cycle accumulated with the passage of the helix through the device. To meet this problem a circuit is incorporated which injects an extra pulse into the counter each time a predetermined number of count cycles is encountered. Thus the occurrence of a non-integral pitch distance, as measured in microns, is compensated for and the pen record remains at zero deflection for zero deviations from the ideal helix turn position.

It is a feature of this invention that the periodicity of a structure be measured by a counting circuit which counts continuously occurring pulses as the structure is moved, the count being automatically transferred to storage and reading apparatus on each occurrence of the repetitive portion of the periodic structure being measured.

It is another feature of this invention that the measuring pulses be generated by a pair of optical gratings and a photodetector, the movable optical grating being mechanically mounted and movable with the structure being measured. Further in accordance with this feature of the invention the occurrence of the repetitive portion of the periodic structure is also determined by the interception of a light beam causing a photodetector to generate a pulse.

It is a further feature that means be provided to begin the counting of the continuously occurring pulses in the middle of a count cycle of the counting circuit.

It is a still further feature of this invention that a selector switch determine the count cycle of the counting circuit. Further in accordance with a feature of this invention a second selector switch determines the initial set of the counting circuit. Thus in accordance with our invention the count of the counting circuit to be transferred to the storage and recording means is determined by the count cycle setting, the initial setting, and the occurrence of the pulse due to the passage of the repetitive portion of the structure being measured.

It is still another feature of this invention that a control circuit transfer a particular count of the continuously cycling electronic counting circuit to the storage and recording circuits without interrupting the counter operation.

A still further feature of this invention is the provision of a pulse injection circuit to inject a pulse into the counter circuit on occurrence of a predetermined number of count cycles.

An additional feature of this invention is the inclusion of a circuit which detects the midpoint of an amplitude-varying electrical signal upon its change of amplitude, regardless of the value assumed by the preceding amplitude peak.

A complete understanding of this invention and of these and various other features thereof may be gained from consideration of the following detailed description and the accompanying drawing, in which.

Figures 1, 2, 3, 11:
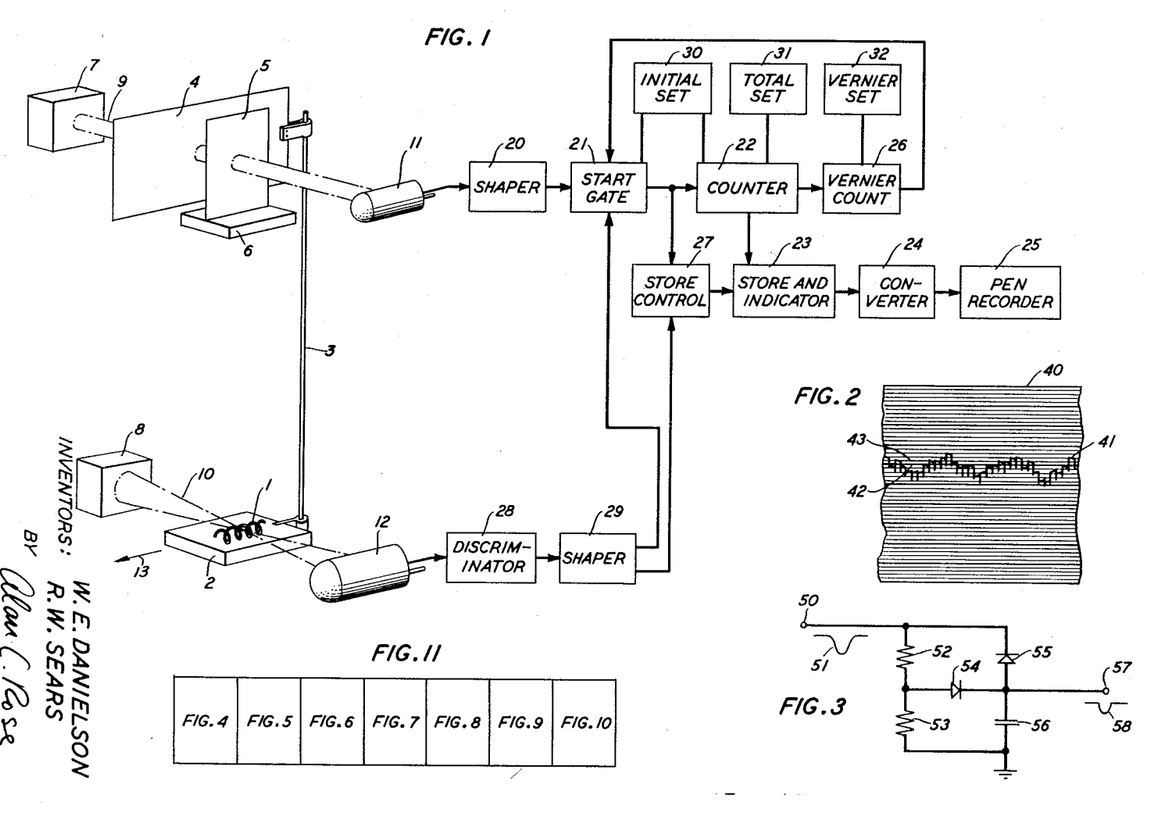
Fig. 1 is a simplified block diagram of one specific embodiment of the invention.
Fig. 2 is a reproduction of a section of a typical permanent record produced by one specific embodiment of the invention during the measurement of a particular helix structure.
Fig. 3 is a schematic diagram of a portion of the discriminator circuit employed in the embodiment of Fig. 1.
Fig. 11 is a plan showing the arrangement of Figs. 4 through 10.

With reference to Fig. 1, there is depicted therein a simplified block diagram of one specific embodiment of our invention. This figure shows a helix 1 placed upon a block 2 for measurement in the device. Attached to the block 2 by mechanical member 3 is an optical grating 4. The connected components are so situated in the device that they move together in the direction along arrow 13. Adjacent optical grating 4 is a second optical grating 5 on a standard 6 which is fixed so that optical grating 5 remains stationary. From light source 7, a collimated light beam 9 is directed through optical gratings 4 and 5 to a photodetector tube 11. This arrangement is such that as optical grating 4 moves with the helix 1 relative to optical grating 5 the light beam 9 is periodically interrupted, resulting in a repetitive series of light and shadow patterns impinging on photodetector tube 11, which thereupon produces an electrical signal whose amplitude varies in accordance with the intensity of the previously mentioned light and shadow patterns. Light source 8 produces a focused light beam 10 whose focus is arranged to coincide with the position of a particular portion of each turn of helix 1 as it crosses the beam. This results in a periodic interruption of the light impinging on photodetector tube 12, producing a corresponding electrical signal at the output of tube 12.

The output of tube 11, after passing through tube shaper 20, is applied to "Start" gate 21 for eventual application to counter 22. The counter 22 is controlled by a "Total Set" switch 31 which determines the length of the count cycle and "Initial Set" switch 30 which determines the point in the cycle at which counter 22 begins its count and which also prepares the start gate 21 for operation.

The output of tube 12 is applied through discriminator 28 to shaper 29 which produces out-of-phase signals, one of which is applied to start gate 21 and the other of which is fed to the store control stage 27. The output of shaper 29 which is fed to "Start" gate 21 is used only to initiate the operation of the counter 22 upon the interruption of the light beam 10 by the first turn of helix 1. Subsequent interruptions of light beam 10 cause the store control stage 27 to record the existing condition of counter 22 in store and indicator stage 23. This stored condition is applied through converter 24 to a pen recorder 25 which thereupon makes a mark corresponding to the deviation of a particular turn of helix 1 from its intended position, as measured by this specific embodiment of our invention.

Vernier set switch 32 controls Vernier count stage 26 to cause the repetitive application of extra pulses to "Start" gate 21 in the event that the pitch distance of the helix under measurement does not correspond to an integral number of counter pulses derived from tube 11. The purpose of this feature is to maintain the measurement record steady about some center line of the record paper rather than have the record gradually wander toward one side or the other as would be the normal result if each pitch distance corresponded to a fractional count.

Fig. 2 depicts a section of a typical record of what is produced by one specific embodiment of our invention for the measurement of a traveling wave tube helix. The pen record 41 is shown on graph paper 40 which has been graduated in a series of lines 42 and 43. The specific embodiment of our invention herein described is designed to record the deviation of helix turn position to an accuracy of one micron. In the record depicted in Fig. 2 this corresponds to the distance between lines 42 and 43. Each horizontal segment of the record 41 relates to a particular turn of the helix being measured.

In Fig. 2, if the record 41 can be considered to be approximately centered about the line 42, it can be seen that certain helix turns fall at their intended position, that is, with zero deviation, whereas other helix turns are out of position by varying amounts of either positive or negative deviation. Furthermore, in the section of the record depicted in Fig. 2 it can be seen that the deviation from the intended position varies from turn to turn in a periodic fashion. It has already been mentioned that it is this particular manner of deviation which is most troublesome and which it is most desirable to detect. It is evident from examining Fig. 2 that the presentation of the recorded measurements in the fashion illustrated, that is, to show the deviation of each helix turn from its intended position and in sequential relationship to the record of the deviation of adjacent turns, makes this type of deviation from periodicity peculiarly evident.

Accordingly it can be appreciated that in the embodiment of our invention depicted in Fig. 1 a very accurate measuring standard is provided by the optical gratings, which measuring standard is mechanically tied to the structure being measured. Further what is obtained on each passage of the repetitive portion of the helix through the light beam 10 is a count, which is stored in the store and indicator circuit 23. In accordance with our invention the counter is initially set and then recycled so that, if the periodicity of the structure being measured is perfect, the count transferred from the counter 22 is the same for each transfer operation. Further, as discussed more fully below, this transfer occurs without interrupting the counting cycle of the counter itself.

Fig. 3 depicts a portion of the discriminator stage 28 of the specific embodiment of our invention depicted in Fig. 1. In Fig. 3 equal resistors 52 and 53 are connected in series between input terminal 50 and ground. Between the common point of resistors 52 and 53 and the output terminal 57 is connected diode 54. Diode 55 is connected between input terminal 50 and output terminal 57 while capacitor 56 is connected between output terminal 57 and ground. The purpose of this circuit is to provide at output terminal 57 a signal 58 which corresponds to the lower half of signal 51 at input terminal 50. This is desirable so that there will be a precise indication of the location of the midpoint of the positive-to-negative shift of signal 51 whose positive peaks are inconstant in amplitude. As terminal 50 reaches the amplitude of one of the positive peaks of waveform 51, because of the voltage dividing action of resistors 52 and 53 capacitor 56 charges through diodes 54 to one-half the value of this amplitude. As terminal 50 shifts negative in accordance with waveform 51, capacitor 56 maintains its charge due to the fact that both diodes 54 and 55 are momentarily reverse biased. This condition exists until terminal 50 becomes more negative than output terminal 57 which has been maintained by the charge on capacitor 56 at a potential equal to one-half the positive peak amplitude of waveform 51. When the potential of input terminal 50 has shifted half way from its positive to its negative peak amplitude, diode 55 conducts and the remainder of waveform 51 is reproduced at output terminal 57, thus permitting recognition of the exact point in time when the potential of terminal 50 passed this midpoint.

Figure 4:
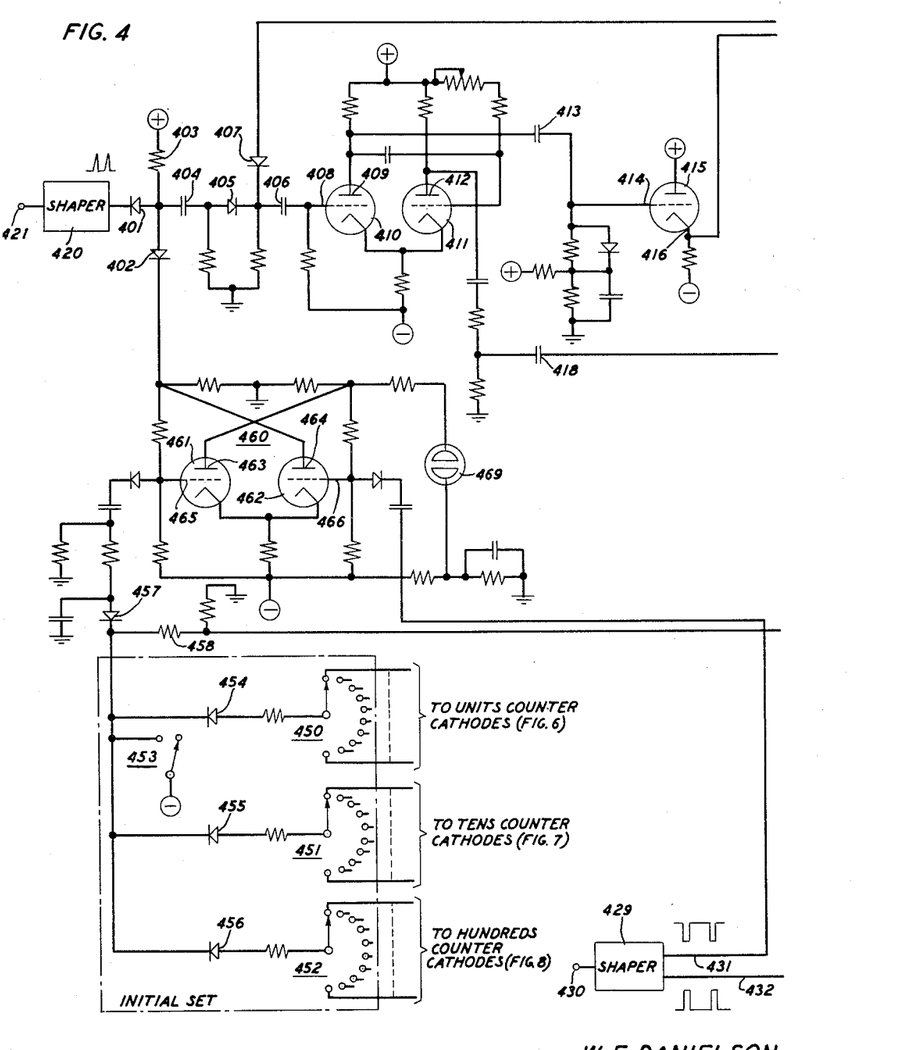
Figs. 4, 5, 6, 7, 8, 9 and 10 depict schematically the major portion of the electronic circuitry employed in one specific embodiment of our invention in accordance with Fig. 1
Figure 5:
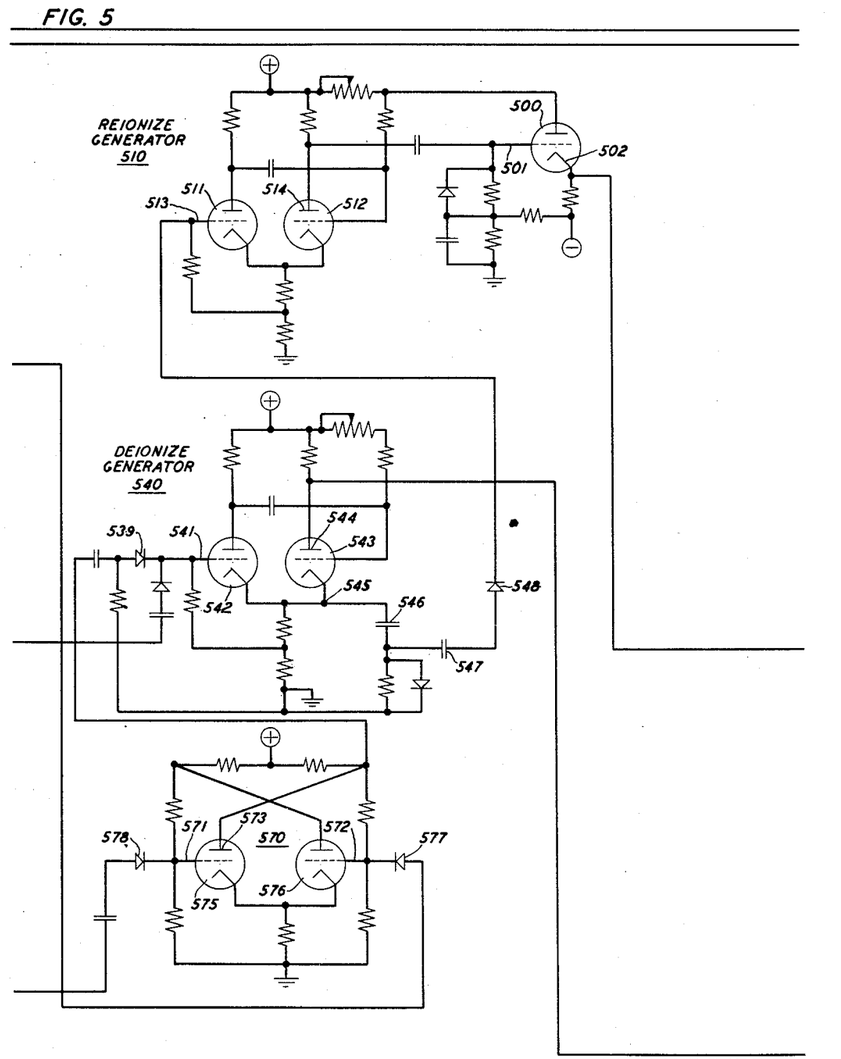

Figs. 4 through 10 taken together depict in schematic form the major portion of the electronic circuitry employed in one specific embodiment of our invention to achieve the counting, computing, and display functions employed in the operation of the measurement device shown in Fig. 1 and described above. In Fig. 4 electrical signals, hereinafter designated measuring pulses, from the output of photodetector tube 11 of Fig. 1 are applied to input terminal 421 and to the pulse shaper 420 which may comprise electrical circuitry as is known by those versed in the art. Output pulses from shaper 420 are applied through diode 401, capacitor 404, diode 405 and capacitor 406 to control grid 408 of tube 410. Tubes 410 and 411 comprise a pulse regenerating circuit, one output of which is taken from plate 409 of tube 410 through capacitor 413 to the control grid 414 of vacuum tube 415, functioning as a buffer stage. The output of this buffer stage is taken from cathode 416 and applied to the stepping cathodes 612 of the units counter stepping tube 610 located in Fig. 6.

Figure 6:
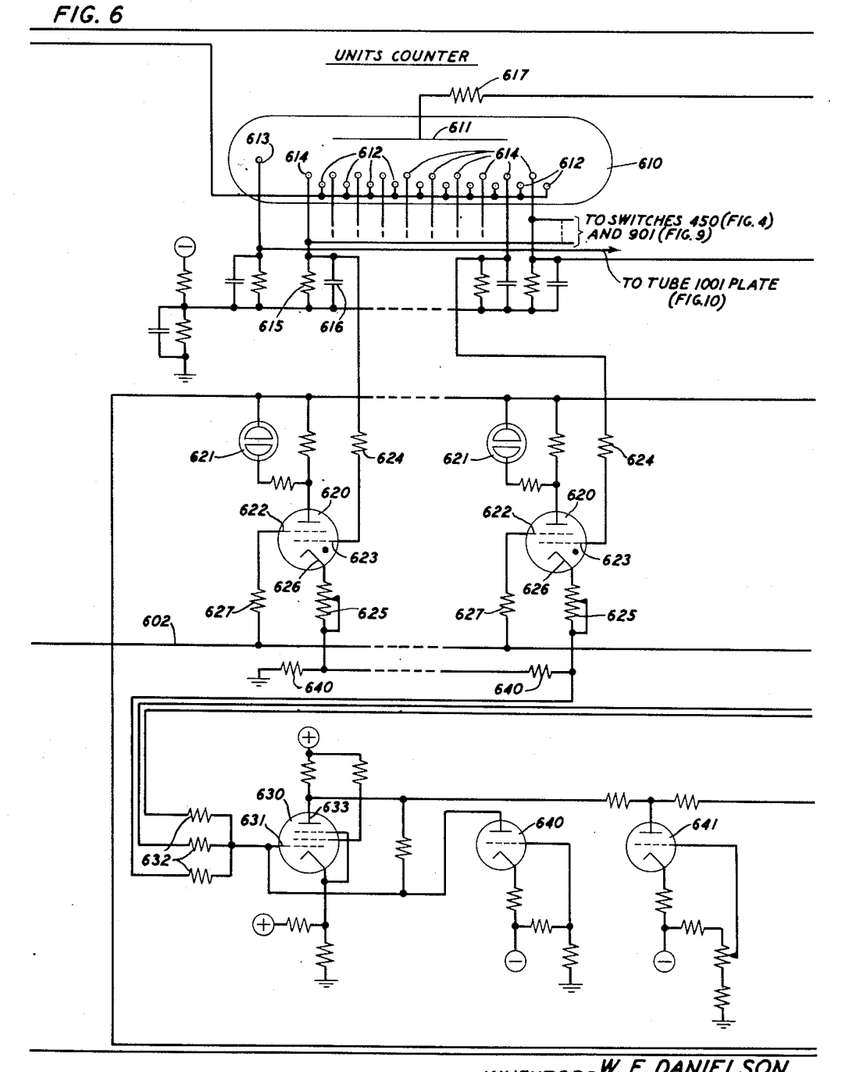
Figure 7:
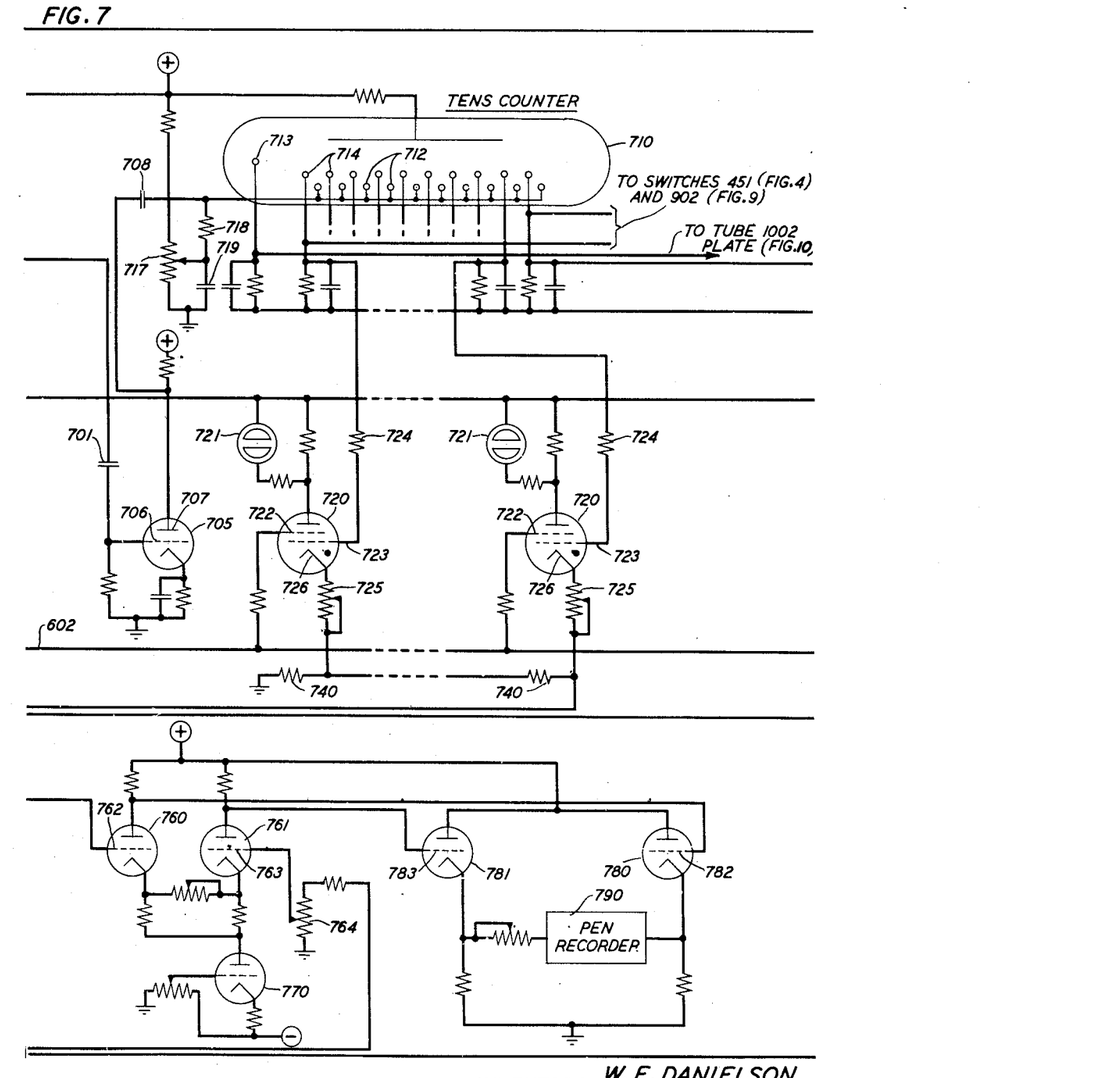
Figure 8:
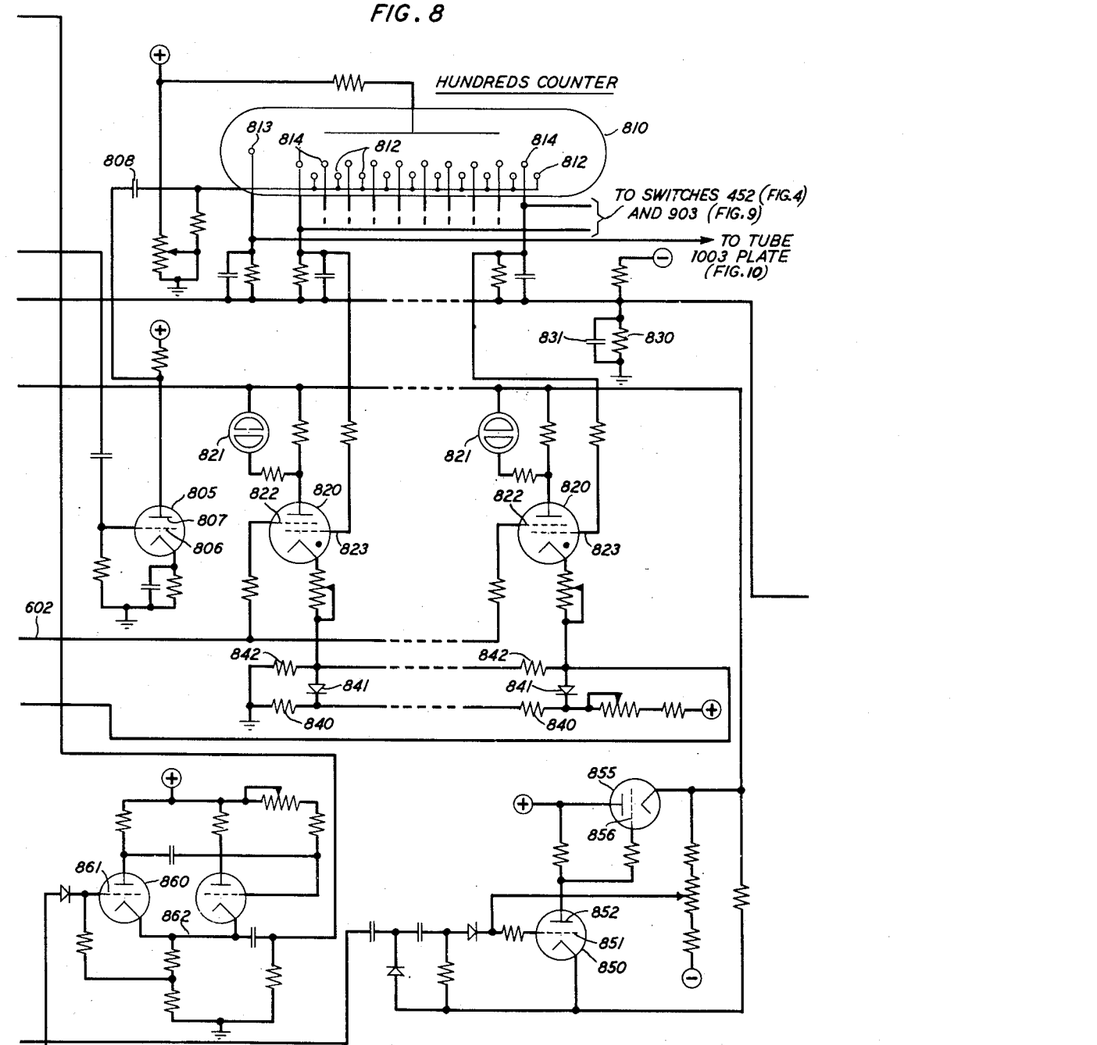

The counting tubes employed in this specific embodiment of our invention, of which tube 610 is typical, are gaseous discharge tubes of the type well known in the art having a single anode and a multiplicity of cathodes; such tubes may be of the type disclosed in M. A. Townsend Patents 2,575,370, November 20, 1951; 2,635,810, April 21, 1953; and 2,682,015, June 22, 1954. One group of cathodes is arranged to cause the glow discharge to be stepped from one to another of the rest cathodes upon the application of proper polarity pulses to the stepping cathodes. The stepping tubes also include a normal cathode which is commonly used to initially locate the glow discharge in preparation for the operation of the tube as a counter. In Fig. 6 counting tube 610 is shown with anode 611, ten rest cathodes 614, ten stepping or transfer cathodes 612 interspersed between the rest cathodes and a normal cathode 613. The normal cathode 613 and each of the rest cathodes 614 are connected through similar stabilizing circuits each comprising resistor 615 and capacitor 616 in parallel, to a common negative point of a voltage divider. Anode 611 is connected to a positive voltage source through resistor 617. Tens counter stepping tube 710 in Fig. 7 and hundreds counter stepping tube 810 in Fig. 8 are similarly connected.

Figure 9:
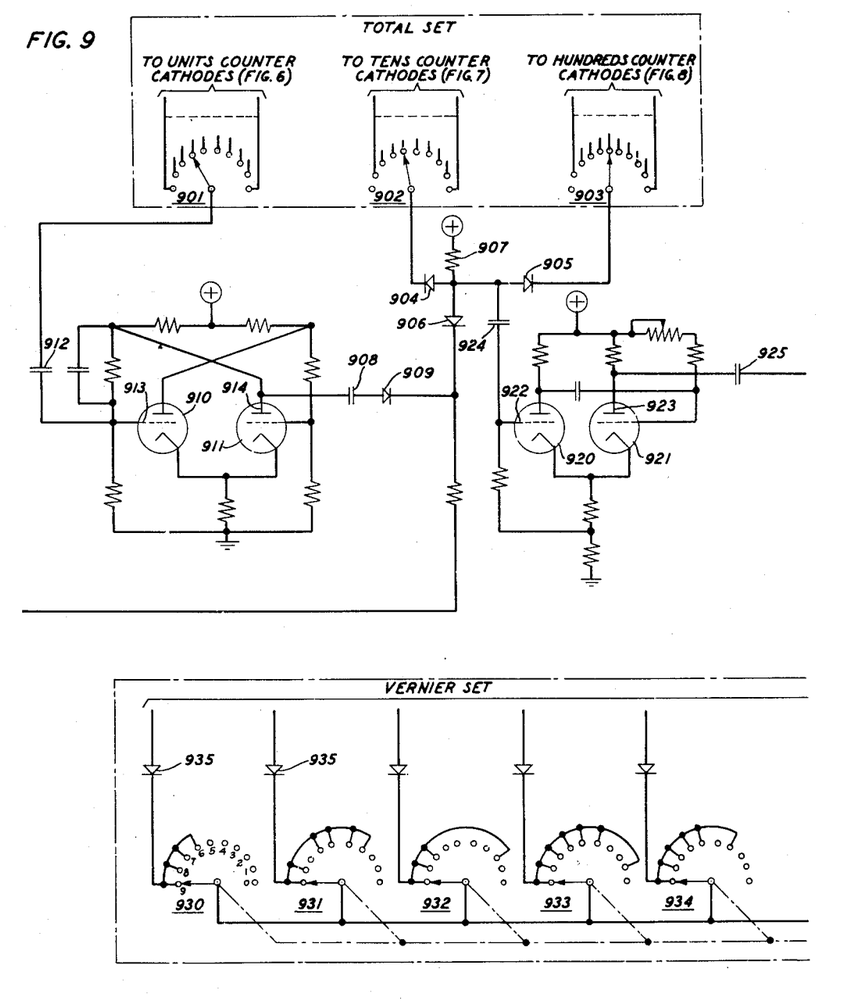
Figure 10:
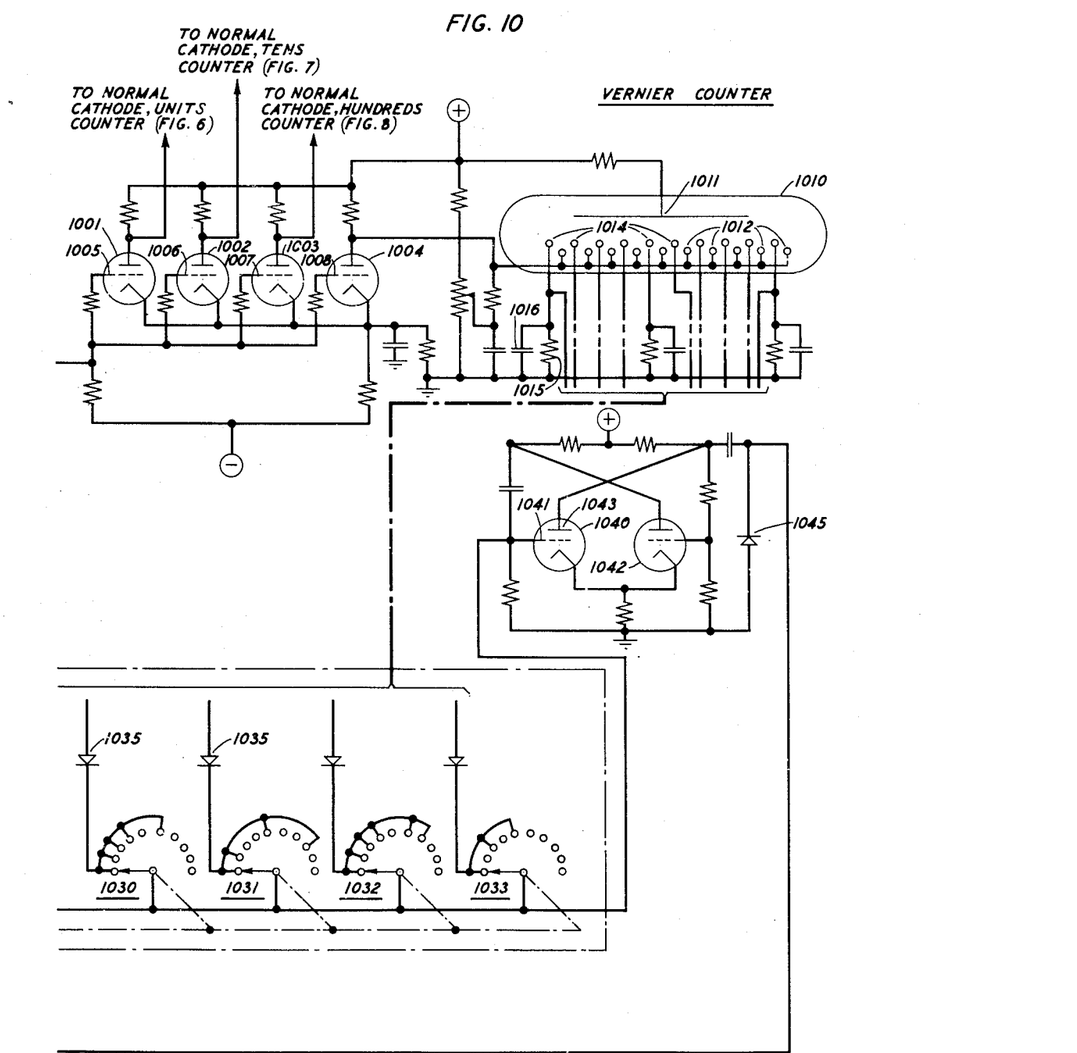

In addition to the foregoing, each of the rest cathodes 614 of stepping tube 610 is individually connected to corresponding terminals of switch 450 in Fig. 4, one of the "Initial Set" switches, and of switch 901 in Fig. 9, one of the "Total Set" switches. Similarly, the rest cathodes 714 of stepping tube 710 are connected to terminals of switches 451 and 902 and the rest cathodes 814 of stepping tube 810 are connected to the terminals of switches 452 and 903. Connections are also made from the normal cathodes of tubes 610, 710 and 810 to the plates of tube 1001, 1002 and 1003, respectively, in Fig. 10. Furthermore, to carry the count from the tenth rest cathode of one counter to the next succeeding counter there is a connection from this tenth rest cathode 614 of tube 610 in Fig. 6 through coupling capacitor 701 in Fig. 7 to the control grid 706 of driving amplifier tube 705. The output of this amplifier is taken from plate 707 and applied through coupling capacitor 708 to the stepping cathodes 712 of the tens counter stepping tube 710. In a similar fashion, the tenth rest cathode of tens counter stepping tube 710 is connected to the grid 806 of driving amplifier tube 805 in Fig. 8 and the plate 807 thereof is connected by coupling capacitor 808 to stepping cathodes 812 of the hundreds counter stepping tube 810.

Connected to each of the first nine rest cathodes 614 of the units counter stepping tube 610 in Fig. 6 is a resistor 624 leading to the control grid 623 of an associated storage thyratron 620. Only the circuitry connected with the first and ninth cathodes 614 is shown in the drawing, the circuitry attached to the intermediate cathodes being omitted for the sake of simplicity but identical to that shown. The first nine rest cathodes 714 of the tens counter stepping tube 710 in Fig. 7 are similarly connected through resistors 724 to control grids 723 of associated storage thyratrons 720, while the first nine rest cathodes 814 of the hundreds counter stepping tube 810 in Fig. 8 are similarly connected to their associated storage thyratrons 820. In each storage circuit, as for example that associated with one of the storage thyratrons 620, a neon display bulb 621 is so arranged that it will be lit whenever its associated storage thyratron tube 620 is in a state of conduction. The cathode 626 of each storage thyratron 620 is connected through a variable resistor 625 to a point on a resistor chain consisting of resistors 640 connected in series between ground and a resistor 632. Since the resistors 640 are all equal and are connected in series, the voltage developed at the terminal of resistor 632 will be dependent upon which storage thyratron 620 happens to be in a conducting state. Similar voltages suitably adjusted to provide proper indications of digit position and value, are derived from storage thyratrons 720 connected to resistors 740 and storage thyratrons 820 connected to resistors 840 and 842 and thence to other resistors 632. Resistors 632 are connected at a common terminal to the control grid 631 of summing amplifier tube 630. This summing amplifier includes tubes 640 and 641 in a circuit known to those skilled in the art. The output of this amplifier is taken from the plate 633 of tube 630 and applied to grid 762 of tube 760 which, with its associated tubes 761 and 770 comprises a difference amplifier, the output of which is fed to grids 782 and 783 of driving amplifiers 780 and 781 which in turn drive the pen recorder 790.

The second grid of each of the storage thyratrons, as, for example, grid 622 of tube 620, is connected through an associated resistor 627 to a common bus 602. Storage of the position of the glow discharge in the stepping tube 610 is accomplished while the tube is being operated and without disturbing its operation by applying a positive pulse to bus 602 at the time the storage in thyratron 620 is to be effected. The control grid 623 which is connected to the rest cathode 614 which happens to be entertaining the glow discharge in stepping tube 610 at any particular instant will have a positive voltage applied to it. Thus, while all of the screen grids 622 are positive due to the pulse applied to bus 602, only one control grid 623 will be positive. Accordingly, only one storage thyratron 620 will conduct current to ignite its associated neon lamp 621 and develop a voltage across the chain of resistors 640 corresponding to its position in the storage chain. In a similar fashion, one of he storage thyratrons 720 and one of the storage thyratrons 820 will conduct current with corresponding results. Therefore, while the glow discharge in the counter stepping tubes 610, 710 and 810 is being rapidly stepped along the rows of cathodes in response to measuring pulses derived from the photo tube 11 of Fig. 1, the storage thyratrons 620, 720 and 820 cause to be displayed the particular condition of the counters at the time that the positive pulse is applied to the bus 602. If this pulse happens to be applied repetitively at the same point in the count cycle the condition of the storage thyratrons does not change.

By means of previously mentioned connections to the rest cathodes of the respective measuring pulse counter tubes 610, 710 and 810, the "Total Set" switches 901, 902 and 903 with their associated circuitry control the recycling of the counting tubes, thus making it possible to establish a count cycle of any length within the counting capacity of the counting tubes provided. As the glow discharge in a stepping tube reaches a particular rest cathode, as, for example, one of the cathodes 614 in tube 610, that particular cathode is driven positive. If that cathode happens to be the one to which the armature of switch 901 is directed, a positive pulse is applied from the armature of switch 901 through capacitor 912 to control grid 913 of tube 910 which, with tube 911 and associated circuitry, is arranged in a monostable pulse regenerator circuit. The output of this circuit is a positive pulse at the plate 914 of tube 911 which is applied through capacitor 908 and diode 909 to the common point of diodes 909 and 906. Diode 904 connected to the armature of switch 902 and diode 905 connected to the armature of switch 903 together with diode 906 and resistor 907 form a coincidence circuit. When the glow discharges in the tens counter stepping tube 710 and the hundreds counter stepping tube 810 reach the rest cathodes connected to the terminals of switches 902 and 903 to which the switch armatures have been set, and the common point of diodes 906 and 909 is driven positive by the output of tube 911, signifying that the glow discharge in units counter stepping tube 610 has reached the rest cathode to which the armature of switch 901 has been set, the common point of diodes 904, 905 and 906 is driven positive. This signal is transmitted through capacitor 924 to control grid 922 of tube 920 which, together with tube 921, forms a monostable pulse regenerator. At the output of this circuit a positive pulse on plate 923 of tube 921 is applied through capacitor 925 to the common connection of grids 1005, 1006, 1007 and 1008 of reset tubes 1001, 1002, 1003 and 1004, respectively. The negative outputs from the plates of tubes 1001, 1002 and 1003 are applied to the normal cathodes 613, 713 and 813 of the respective counting tubes 610, 710 and 810 and cause the count cycle to be repeated. Thus, according to the setting of the "Total Set" switches 901, 902 and 903, the cycle of the counter can be varied from one to one thousand measuring pulses, thereby providing the necessary flexibility essential to permit the measurement of repetitive structures of varying dimensions in accordance with the invention. In practice the "Total Set" switches 901, 902 and 903 are set to establish the count cycle corresponding to the intended pitch distance of the helix being measured, since in this specific embodiment of the invention each unit step of the counter corresponds to a one-micron movement of the helix being measured.

Because it is desirable that the record produced by this specific embodiment of our invention in the measurement of a traveling wave tube helix provide a plot of deviation about some point of zero deviation or ideal location of the particular helix turn, the counter is arranged to be at a position approximately midway in its count cycle upon the occurrence of a pulse from the photo tube 12 of Fig. 1 signifying the presence of a helix turn at the measurement point. This is accomplished by providing "Initial Set" switches 450, 451 and 452 in Fig. 4 whose connections to counting tubes 610, 710 and 810 have already been described. The armatures of the switches 450, 451 and 452 are set at the point in the cycle at which it is desired to initiate counter operation upon the detection of the next succeeding helix turn at the measurement point. The prime switch 453, the armature of which is connected to a negative voltage source, is then momentarily operated to cause a negative pulse to be transmitted through diodes 454, 455 and 456 to the respective initial set switches 450, 451 and 452. These negative pulses, applied to the selected rest cathode in each counter stepping tube, cause the glow discharge in that tube to be situated at the selected cathode. Thus upon the application of pulses to the stepping cathodes 612 the counter begins its count at the point in the cycle designated by the setting of the "Initial Set" switches.

The negative pulse derived from the momentary operation of prime switch 453, is applied also through diode 457 to control grid 465 of tube 461 which, with tube 462, comprises a bistable electronic switch 460. One output of this electronic switch taken from plate 464 of tube 462 is applied through diode 402 to the lefthand side of capacitor 404. Diodes 401 and 402 and resistor 403 comprise a gate which is under the control of the electronic switch 460. The application of a negative pulse to grid 465 of tube 461 results in a negative output at the plate 464 of tube 462, thus inhibiting the input gate by reverse-biasing diode 401 and preventing the passage therethrough of the positive-going pulses from the shaper 420. The output from the plate 463 of tube 461 being positive, the neon "Set" bulb 469 will have developed across it sufficient voltage to cause it to remain lit, thereby indicating that the counting circuit is set and ready to begin recording the position of the turns of the helix to be measured. This situation obtains until the first helix turn signal is applied to terminal 430 after which electronic switch 460 reverses its conduction state, permitting the passage of measuring pulses through diode 401.

Release of the prime switch 453 causes a positive pulse to be transmitted through resistor 458 to grid 541 of tube 542 which, in conjunction with tube 543, comprises a monostable circuit 540 which functions as a de-ionize generator. The positive pulse derived from the output of this circuit at plate 543 of tube 543 is applied to control grid 851 of amplifier tube 850 in Fig. 8. The resulting negative output at plate 852 applied to control grid 856 of tube 855 causes the removal of the positive voltage normally applied through tube 855 to the plate supply line feeding the storage thyratrons 620, 720 and 820. This causes the extinction of the gaseous discharge in whatever storage thyratrons may be conducting current. When the de-ionize generator 540 returns to its stable state, a positive signal produced by the discharge of capacitor 547 connected through capacitor 546 to the common cathode terminal 545 of tubes 542 and 543 is passed through diode 548 to control grid 513 of tube 511. Tubes 511 and 512 comprise a re-ionize generator circuit 510 whose output is applied from plate 514 of tube 512 to grid 501 to buffer amplifier tube 500. The positive pulse applied to grid 501 is passed through the cathode follower circuit of tube 500 to the screen grid control bus 602 of the storage thyratron chain. This causes the particular thyratron associated with each stepping tube rest cathode entertaining a glow discharge to ignite thereby storing the particular digit associated with that rest cathode.

In addition to the input from the "Initial Set" circuit the de-ionize generator is also controlled by an output from electronic switch 570, which in turn has dual inputs applied to the control grids 571 and 572 of tubes 575 and 576, respectively, comprising the electronic switch 570. Diode 539 connected between plate 573 of tube 575 and grid 541 of tube 542 is poled to pass only positive pulses appearing at plate 573. The input to grid 572 of tube 576 is applied through diode 577 and capacitor 418 from the plate 412 of tube 411. In response to a positive pulse at grid 408, plate 412 is driven positive, thereby causing tube 576 to conduct and driving plate 573 positive. The state of conduction of the two tubes 575 and 576 of switch 570 is reversed upon the appearance of a positive pulse from line 432, one of the outputs of shaper 429 produced by the appearance of a helix turn at the measurement point. Thus, the electronic switch 570 causes the de-ionize generator 540 to extinguish the storage thyratrons upon the appearance of the first measuring pulse following a helix pulse, while the trailing edge of the de-ionize generator pulse, applied through diode 548 to grid 511, causes the re-ionize generator 510 to re-ignite the proper storage thyratrons, as previously described.

The negative pulse output of shaper 429 appearing on line 431 is applied to grid 466 of tube 462 in electronic switch 460 to cause switch 460 to enable the start gate comprising diodes 401 and 402 upon the appearance of the first helix pulse following the momentary closure of the prime switch 453. Subsequent pulses on line 431 have no effect since electronic switch 460 remains in that condition until prime switch 453 is again operated.

In the operation of this specific embodiment of our invention then, as the movable optical grating and helix are moved through the device, both measuring pulses and helix pulses are developed, there being many more measuring pulses than helix pulses. Appearance of the first helix pulse causes the start gate controlling the passage of measuring pulses to be enabled, after which the measuring pulses are regenerated and applied to stepping cathodes 612 of the units counter stepping tube 610.

The electronic counter comprising stepping tubes 610, 710 and 810 changes its condition in response to the number of measuring pulses received and does so on a recycling basis with a cycle determined by the positions of the "Total Set" switches 901, 902 and 903, as previously described. Upon the appearance of each helix pulse, the storage thyratrons are de-ionized and then re-ionized to store the particular state of the counter stepping tubes at the instant that the first measuring pulse following a helix pulse is received. The digital information stored in the storage thyratrons 620, 720 and 820 is combined and converted to analog information at the input of the summing tube 630 and amplified by the driving circuits for the pen recorder 790, causing the recorder to produce a record relation to the deviation from true position of the helix turns, of which Fig. 2 has been described as a sample.

In the measurement of various periodic structures by the use of our invention, structures are encountered where the intended repetitive distance does not correspond to an integral number of distance scale measuring pulses. Since the specific embodiment of our invention described herein presents its measurement results in the form of an accumulated deviation from an ideal position beginning with the first distance measured, it is apparent that, without special provision to compensate for such cases, the pen record, instead of being centered about some line of zero deviation, will wander toward the side of its graph paper as the fraction of a measuring pulse unit left over from each cycle is added to the cumulative total. In such a case the difficulty actually resides in the inability of the specific embodiment of our invention, as described heretofore, to be set with sufficient precision for a count cycle corresponding to the repetitive distance to be measured. Accordingly, we have included in one specific embodiment of our invention a Vernier count circuit, depicted in Fig. 10, to inject extra count pulses when necessary to compensate for fractions of measuring pulses remaining at the end of a count cycle.

The Vernier counter circuit includes a stepping tube 1010 having stepping cathodes 1012, rest cathodes 1014 and an anode 1011, the anode being connected through a suitable current limiting resistor to a source of positive voltage. Each rest cathode 1014 is connected to ground through its associated stabilizing network comprising resistor 1015 and capacitor 1016 in parallel. In addition, each rest cathode 1014 except the fifth one is connected through a diode 935 or 1035 to one of nine ganged selector switches 930 through 934 and 1030 through 1033. The armatures of the selector switches are all connected together to a line leading to the grid 1041 of tube 1040 which, with tube 1042 comprises a monostable pulse regenerator and delay circuit. The output of this circuit taken from the plate 1043 of tube 1040 is applied to the grid 861 of tube 860, which comprises half of a monostable pulse regenerator circuit. The output of this stage is taken from the common cathode connection 862 and applied through diode 407 in Fig. 4 to the control grid 408 of tube 410 in the units counter driving circuit. The stepping cathodes 1012 of Vernier counter stepping tube 1010 are connected to the output of tube 1004. Since the grid 1008 of tube 1004 is connected to the coincidence circuit associated with the total set switches 901, 902 and 903, tube 1004 produces an output each time the three stage counter depicted in Figs. 6, 7 and 8 completes a count cycle.

In operation, the "Total Set" switches controlling the count cycle are set for the next highest integral number of count pulses including the fractional number of pulses actually determined to correspond to the intended repetitive distance of the structure under measurement. As the measuring pulse counter goes through its repetitive cycles, the glow discharge in the Vernier counter stepping tube 1010 advances along the rest cathodes 1014, one position for each cycle of the measuring pulse counter. Depending upon the setting of the Vernier set switches 930 to 934 and 1030 to 1033, there may or may not be a positive pulse applied to grid 1041 as the glow discharge reaches a particular rest cathode 1014. The monostable circuit comprising tubes 1040 and 1042 together with diode 1045 furnishes a necessary delay in the pulse to be injected through diode 407 to grid 408, since the negative leading edge of the output signal is bypassed through diode 1045 while the positive trailing edge is applied to grid 861 to trigger the monostable circuit including tube 860.

The extra pulses applied through diode 407 to grid 408 of tube 410 in the units counter driving circuit actually have the effect of shortening the count cycle, since they cause an advance of the unit counter in the absence of a true measuring pulse. With the "Total Set" switches set as described to provide for the measurement of a repetitive distance corresponding to a non-integral number of measuring pulses it is apparent that the recording device would show an apparent deviation with each cycle equal to the difference between the true count and the next largest integral number. The "Vernier Set" switches are accordingly set to cause the Vernier counter to make up this difference in ten cycles of the measuring pulse counter. Thus if the fraction above an integral count for a particular distance to be measured is determined to be $7/10$ of a count, for example, with the "Total Set" switches fixed as described, the counter loses the complement of this fraction with each count cycle, namely $3/10$, or three counts in ten cycles. Accordingly, the Vernier counter should inject three extra pulses in ten cycles.

Referring to the No. 3 position of the "Vernier Set" switches, it can be seen that at this setting there will be exactly three pulses applied to grid 141 of tube 140 while the Vernier counter passes through one complete cycle of its operation. In this fashion provision is made for taking care of non-integral count pitch distances of the structure under measurement with sufficient accuracy to assure that the pen record does not run off the paper during the time of measurement of the structure of interest.

It should be pointed out that while the specific embodiment of our invention described herein shows a measuring pulse counter having three stages and a Vernier counter limited to one stage, it will be apparent to those skilled in the art that the counting scale may be extended to any desired number without departing from the scope of our invention by simply adding extra counting stages as needed in a manner similar to that in which the hundreds counting stage is connected to the tens counting stage of the distance pulse counter. In addition it may be pointed out that, while not included in the above-described specific embodiment of our invention, it is within the scope of the invention to use the electronic counter and associated storage control circuitry to provide an indication of the lateral dimensions of the detected segments of the structure being measured as well as the indication of positions of the segments.

It is to be understood that the above-described arrangements are illustrative of the principles of our invention. Numerous other arrangements may be devised by those skilled in the art without departing from the spirit and scope of the invention.

What is claimed is:

1. Apparatus for gauging the periodicity of a periodic structure comprising means for moving the periodic structure, means for accurately measuring increments of movement of said structure, said increments being equal and a small fraction of the period being measured, counting means, means for relating the cycle of said counting means to an intended distance between particular points of said periodic structure, a light beam focused on said structure, associated photodetecting means providing a response to interruptions in said light beam caused by the passage of said particular points of said structure through said beam, display means included in said apparatus, and means connected to said photodetecting means to cause the recording of the state of said counting means by said display means upon said response from said photodetecting means.

2. Apparatus as set forth in claim 1 in which said means connected to said photodetecting means includes means for detecting the mid-point of the electric voltage output of said photodetecting means, said voltage varying between maximum and minimum potentials.

3. Apparatus for measuring the fidelity to periodicity of a structure comprising means for moving the structure, means for producing electrical pulses at successive positions during each movement of said structure over a distance between corresponding portions of said structure, counting means having a plurality of states for counting said pulses, means for recycling said counting means upon said movement of said structure over an intended distance between said corresponding portions thereof, means for detecting the presence of successively recurrent corresponding portions of said structure at a fixed point, and means connected to said detecting means for recording the state of said counting means upon the occurrence of a signal from said detecting means.

4. Apparatus as set forth in claim 3 in which said detecting means comprises a light beam and light responsive means on opposite sides of said structure.

5. Apparatus as set forth in claim 3 in which said electrical pulse producing means comprises a light source, a fixed optical grating, a movable optical grating adjacent said fixed optical grating and connected to said structure, and photodetecting means opposite said light source to detect the interruption of light from said source by said optical gratings.

6. Apparatus for determining the deviation from intended periodicity of a structure having a configuration of repetitive sections comprising means for moving said structure, means for producing electrical pulses related to said movement of said structure, counting means to count said pulses, means for causing said counting means to recycle in accordance with the intended periodicity of said measured structure, detecting means for producing a signal upon the passage of each said repetitive section of said structure past said detecting means, recording means included in said apparatus, and means connected to said detecting means to cause the recording of the state of said counting means by said recording means.

7. Apparatus as set forth in claim 6 in which said counting means includes pulse means for injecting regularly spaced pulses to compensate for cumulative errors in said counting means resulting from the existence of an intended period in said structure corresponding to a non-integral number of pulses from said pulse producing means.

8. Equipment for measuring the pitch of a helical wire structure comprising means for moving said structure past a fixed point, means for producing electrical pulses corresponding to said structure movement in small increments relative to said pitch being measured, storage means having a plurality of states to establish a count of said electric pulses, recycling means to cause said storage means to begin a new count cycle after the occurrence of a number of said pulses corresponding to a distance equal to the intended pitch of said structure, means for periodically injecting a correcting pulse in the event that said intended pitch corresponds to a non-integral number of said electrical pulses, detecting means for producing a signal upon the presence of a particular portion of said moving helical wire structure adjacent said detecting means, control means for initiating said count cycle at a particular stage of said storage means upon receiving the first signal from said detecting means, said control means further passing information indicating said state of said storage means existing upon the reception of a signal from said detecting means, and recording means for recording said information passed by said control means.

9. Equipment as set forth in claim 8 in which said means for producing electrical pulses comprises a light source, a pair of optical gratings, one fixed and one movable with said helical wire structure to interrupt periodically the light beam from said light source, and light responsive means for detecting said interruption of said light beam.

10. Equipment as set forth in claim 8 in which said storage means comprises a plurality of gaseous discharge stepping tubes, each having an anode and a plurality of cathodes, and circuit connected to said tubes cooperating to cause said gaseous discharge to be transferred along said cathodes upon the application of said electrical pulses, the position of said gaseous discharges in said stepping tubes indicating the state of said storage means.

11. Equipment as set forth in claim 8 in which said detecting means comprises a light source adjacent said helical wire structure and light responsive means adjacent said helical wire structure on the opposite side from said light source.

12. A precision measuring device comprising optical gratings and photodetection means for accurately determining degrees of movement of a structure being measured, counting means attached to said photodetection means having a variable count cycle, means for setting said count cycle at a predetermined value related to an intended length of a section of said structure, second photodetection means for detecting the presence of successive corresponding portions of the measured structure at a particular point, recording means attached to said counting means, and means connected to said second photodetection means for effectuating operation of said recording means by the count of said counting means.

13. A precision measuring device as set forth in claim 12 wherein said counting means includes an electrical circuit to prevent the cycling of said counting means prior to the application of a control signal from said second photodetection means without interfering with its counting operation after the occurrence of the initial control signal.

14. An automatic precision measuring device comprising a pair of optical gratings, a first light source shining upon said gratings, first photodetection means opposite said first light source, electronic counting means attached to said first photodetection means, means connected to said counting means for determining the cycle of said counting means in accordance with a predetermined distance to which said structure is intended to conform, a second light source, second photodetection means opposite said second light source for indicating the interruption of light from said second light source by successive corresponding portions of said structure, control means between said second photodetection means and said electronic counting means to start the count of said electronic counting means in response to the initial signal from said second photodetection means without affecting said count in response to succeeding signals from said second photodetection means, and recording means connected to said electronic counting means.

15. An automatic precision measuring device as set forth in claim 14 wherein said control means includes an electrical circuit comprising a pair of resistors connected together, a pair of diodes connected to each other and across one of said resistors, and a capacitor connected between said pair of diodes common point and the other of said resistors, whereby said electrical circuit bisects the voltage wave form applied across said pair of resistors.

16. A precision automatic measuring device comprising means for producing electrical measuring pulses in correspondence with small increments of movement of a structure to be measured, means for detecting the presence of repetitive sections of said structure at a given point, counting means for counting said electrical measuring pulses, first control means for determining the length of the cycle of said counting means to correspond to a predetermined distance which is intended to be delimited by said repetitive sections, display means attached to said counting means for indicating the state of said counting means at a particular instant of time, second control means attached to said counting means for causing said counting means to initiate its count at some predetermined position in its cycle, and pulse injection means for adding pulses to said counting means at a predetermined rate to compensate for errors inherent in the measurement of distances corresponding to a nonintegral number of measuring pulses.

17. A measuring device as set forth in claim 16 wherein said display means includes means for storing a condition corresponding to a particular state of said counting means without interrupting the operation of said counting means.

18. Apparatus for determining deviations from intended periodicity of a periodic structure comprising a light source, a light responsive device, means for moving said periodic structure intermediate said source and device and relative thereto, means for generating electrical pulses precisely corresponding to increments of said relative motion, means for counting said electrical pulses, means for setting the cycle of said counting means to correspond to the intended periodicity of the periodic structure, storage means, display means actuated by said storage means, and means responsive to a change of output of said light responsive device in one direction caused by the presence of one of a number of successive corresponding segments of said periodic structure at a predetermined point for transferring the count of said counting means to said storage means to actuate said display means.

19. Measuring apparatus for automatically providing repetitive indications of the spacing between elements of a structure comprising first pulse means for producing pulses accurately related to the position of said structure, second pulse means for producing pulses signifying the detection of an element of said structure at a measurement point, means for moving said structure relative to said measurement point, counting means connected to said first pulse means for counting pulses from said first pulse means, means for relating the cycle of said counting means to a predetermined distance to which said spacing between elements is intended to conform, recording means connected to said counting means, and control means for recording the state of said counting means in said recording means upon the occurrence of a pulse from said second pulse means.

20. Measuring apparatus as set forth in claim 19 wherein said control means includes means for causing said counting means to initiate its operation upon the occurrence of the initial pulse from said second pulse means.

21. Apparatus for automatically providing measurements of distances between repetitively occurring selected segments of a structure to be measured and for indicating deviations from an intended periodicity thereof comprising first pulse means for producing electrical pulses corresponding to increments of distance small in relation to the distances being measured, second pulse means for providing electrical pulses related to the positions of said segments in said structure, counting means connected to said first pulse means for counting pulses from said first pulse means, means for causing said counting means to recycle at predetermined periodic intervals related to the intended periodicity of said structure, display means connected to said counting means for providing an indication of said measurements, control means connecting said second pulse means and said counting means for causing the state of said counting means to be relayed to said display means upon the production of a pulse by said second pulse means.

22. A precision automatic measuring device for indicating deviations from intended periodicity of a repetitive structure comprising means for producing electrical measuring pulses in correspondence with small increments of movement of a structure to be measured, counting means for counting said electrical pulses, first control means connected to said counting means for causing said counting means to initiate its count at some predetermined position in its cycle, means for resetting said counting means on the count of a number of pulses corresponding to the intended period between repetitive sections of said structure being measured, means for detecting the presence of said repetitive sections of said structure at a given point, storage and recording means connected to said counting means, and second control means connected to said detecting means for controlling the transfer of the count from said counting means to said storage and recording means upon detection of the presence of one of said repetitive sections of said structure at said given point.

References Cited in the file of this patent

UNITED STATES PATENTS

| | | |
|---|---|---|
| 2,206,853 | Poupitch | July 2, 1940 |
| 2,301,935 | Ehringhaus | Nov. 17, 1942 |
| 2,351,337 | Houston | June 13, 1944 |
| 2,665,411 | Frady | Jan. 5, 1954 |
| 2,730,698 | Daniels et al. | Jan. 10, 1956 |
| 2,734,188 | Jacobs | Feb. 7, 1956 |
| 2,770,798 | Roth | Nov. 13, 1956 |